J. BLUE.

Straw Carrier.

No. 4,413.

Patented March 14, 1846.

UNITED STATES PATENT OFFICE.

JOHN BLUE, OF COVERT, NEW YORK.

BELT FOR CONVEYING STRAW AND GRAIN.

Specification of Letters Patent No. 4,413, dated March 14, 1846.

*To all whom it may concern:*

Be it known that I, JOHN BLUE, of Covert, in the county of Seneca and State of New York, have invented a new and useful Improvement in Machines for Threshing and Separating Grain from Straw, and that the following is a full, clear, and exact description of the principle or character which distinguishes my invention from all other things before known, and of the manner of making, constructing, and using the same, reference being had to the accompanying drawings, making part of this specification, in which—

Figure 2:
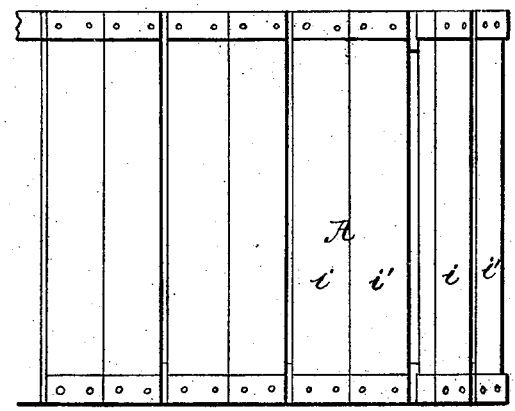
Figure 3:
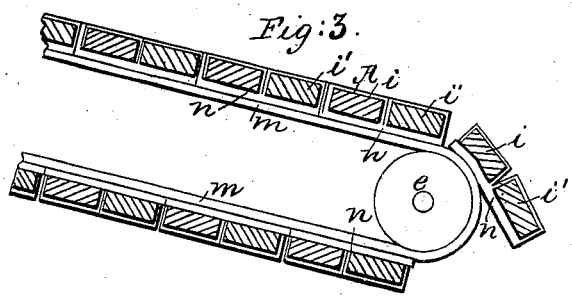
Figure 1:
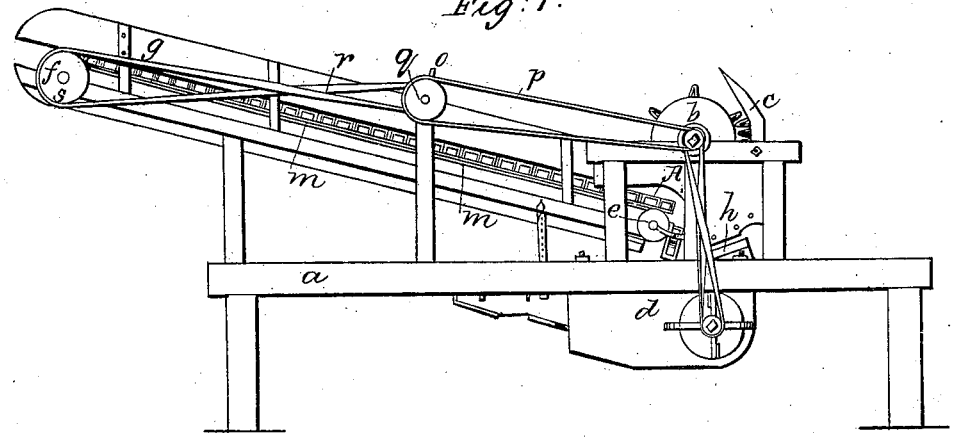

Figure 1 is an elevation of the machine with my improvement added; and Figs. 2 and 3, a plan and section (on an enlarged scale) of a portion of the endless belt of slats for conducting the straw, as improved by me.

The same letters indicate like parts in all the figures.

In many of the threshing machines now in use the threshed grain and straw are thrown by the threshing cylinder onto an inclined endless belt of slats which carries off the straw, the slats being placed sufficiently far apart to permit the grain to pass through and fall onto an inclined board which delivers it to the fanning mill. Much inconvenience arises in the use of these machines from the occasional passage of straw through the spaces between the slats, (in running up the inclined plane) which falls onto the slats below and is by them carried down around the roller at the lower end of the belt, so that in a short time this part of the machine becomes clogged and stops. Various devices have been resorted to to overcome this inconvenience, some of which have entirely failed and others are too costly or too liable to derangement. My improvement effectually cures this evil at very little cost and without rendering the machine more complex. It consists in forming the endless belt by attaching every alternate slat to two narrow endless belts of leather, and connecting the other slats to these instead of attaching them directly to the leather belts, so that as each slat that is attached to the leather belts begins to pass up around the lower roller the one attached to it is thrown open or out of the curved line formed by the leather belts and thus leaves a free discharge for straw or any other substance that may have fallen through.

In the accompanying drawings ($a$) represents a frame supporting a threshing cylinder ($b$) and concave ($c$) of any desired construction and ($d$) a fanning mill, which in like manner may be of any desired construction. The grain and straw is discharged by the threshing cylinder onto an endless belt of slats (A) that passes around two rollers ($e, f$), one just under the threshing cylinder, and the other at the back end of the inclined frame ($g$), and as the straw is carried up the inclined plane by the belt the grain falls through the spaces between the slats of the belt onto an inclined board ($h$) which conducts it into the fanning mill ($d$); but as much of the grain which passes through the spaces between the slats in going up remains on the slats of that part of the belt which is below and passing down, and very frequently spears of straw and other substances fall through with the grain and tend to clog the machine, I make the belt by attaching every alternate slat ($i$) to two endless leather belts ($m, m$) one on each side, and the intermediate slats ($i'$) instead of being attached in like manner to the belts are attached to the slats ($i$) by means of pieces of leather ($n, n$) riveted or otherwise secured to the ends of the slats ($i'$) and let in between the slats ($i$) and the leather belts ($m, m$) so that in approaching the lower roller ($e$) the slats ($i$) approach the roller first, and in passing around the roller throws the slat ($i'$) out of line, and thus makes an opening for the discharge of the grain straw and all other substances that may have fallen through the upper part. In this way all tendency to clog the operation of the machine is effectually prevented. Instead of connecting the opening slats ($i'$) to the other slats $i$ by strips of leather it will be obvious that any other mode of attaching them may be adopted at pleasure without changing the principle of my invention; it will be equally obvious that instead of making every alternate one to open, a less number may be thus arranged without changing the principle of my invention, but the operation will be less perfect. I have described that mode which from experience I find the cheapest and best.

For the purpose of insuring the separation of the grain from the straw in its passage up, it passes under and is stirred up by a rotating rake (o), operated by a belt (p) from a pulley on the shaft of the threshing cylinder passing over a pulley (q) on the shaft of the rake, and from another pulley on this same shaft another belt (r) passes over a pulley (s) on the shaft of the roller (f), to communicate motion to the belt of slats.

What I claim as my invention and desire to secure by Letters Patent, is—

Forming the endless belt of slats, for carrying up and separating the grain from the straw, by attaching or jointing the alternate slats to those which are attached to the belts or chains which connect the whole together, substantially as herein described, to form openings for the discharge of straw, grain or foreign matter, as herein described.

JOHN BLUE.

Witnesses:
C. W. M. KELLER,
B. H. WOOD.